United States Patent Office 3,484,238
Patented Dec. 16, 1969

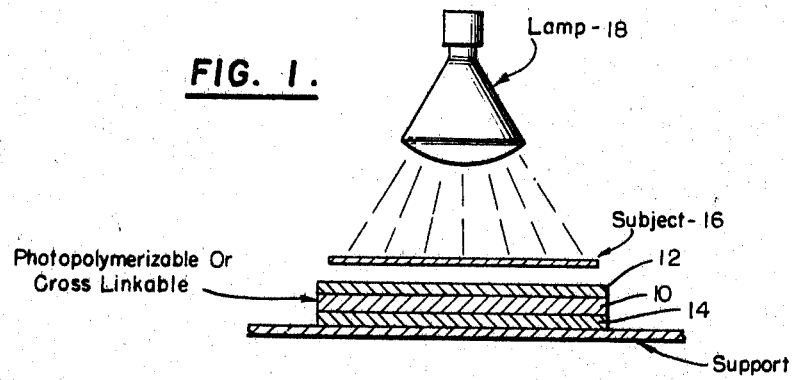
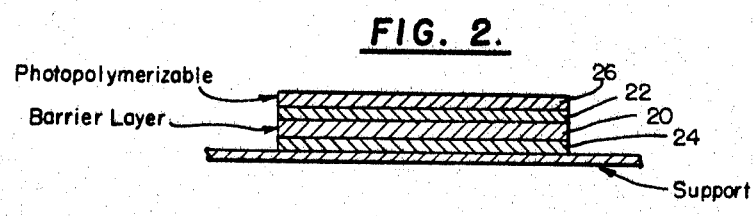
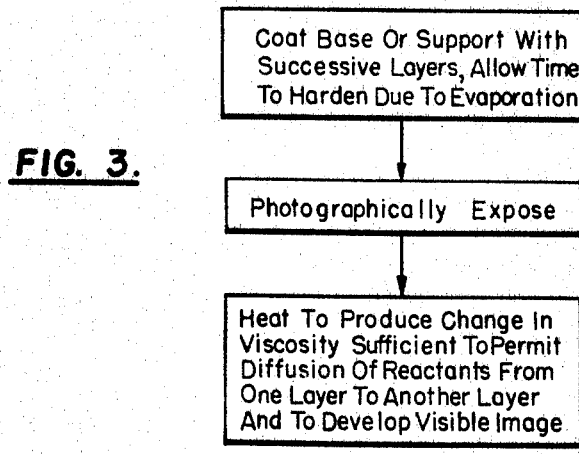

3,484,238
**PHOTOGRAPHIC ELEMENT AND
DIFFUSION PROCESS**
Robert D. Fox, Shaker Heights, Ohio, assignor to Horizons Incorporated, a division of Horizons Research Incorporated, a corporation of Ohio
Continuation of application Ser. No. 469,138, July 2, 1965. This application Jan. 28, 1969, Ser. No. 797,367
Int. Cl. G03c 5/54
U.S. Cl. 96—29                    8 Claims

ABSTRACT OF THE DISCLOSURE

A photographic process and film is described in which diffusion of one reactant from one layer of a multi-layer film through a photopolymerizable (includes crosslinkable) layer and into a layer containing a second reactant creates a visible dye image by means of thermal reaction between the reactants. Positive or negative images are possible depending upon the arrangement of layers of the film. The film can be either solvent rinsed or merely heated in order to fix the image.

The photopolymerization process during exposure creates regions of varying viscosity corresponding to a latent image and controls the diffusion rate of the diffusing reactant.

The process is applicable to materials such as organic halogen containing compounds, acids, anhydrides, and mercaptans as diffusing reactants and leuco and carbinol compounds, as well as styrly or cyanine bases as the dye formers.

---

This is a continuation of application Ser. No. 469,138, filed July 2, 1965, now abandoned.

The invention relates to photography. More particularly, it relates to the use of a photopolymerizable layer in a layered film to produce a latent image resulting from a photographic exposure. The latent image is utilized to control the development of a useful visible image in another of the layers in the film.

In this description photopolymerization is intended to include crosslinking as well as simpler forms of polymerization.

In photographic processes, such as those described in Photographic Science and Engineering vol. 8, No. 2, pages 95–103 inclusive, a colored image is formed as the result of a reaction between originally colorless materials, which reaction is described as resulting from free radicals produced as a result of the exposure of the composition to a suitable dosage of radiation.

As described in the above article, the photosensitive composition is prepared by adding the several constituents to a liquid solvent which may also contain a film-forming binder and then casting the composition onto a base, or impregnating an absorbent base, such as paper with the mixture, e.g. by dipping or spraying. When the liquid solvent evaporates it leaves behind an intimate mixture of the several constituents. held in place by either a binder or by the substrate by whcih the mixture is supported.

When any of the constituents is sensitive to visible light it is necessary to prepare the film in a darkroom under a safelight and to store it under such conditions that the film does not become prematurely or accidentally "exposed."

One known technique which has been used in the art of photography involves the physical separation of the active ingredients by any suitable means so that they cannot react with one another until the physical barrier (e.g. a capsule) is broken.

The present invention is directed to a photographic system in which the mutually reactive constituents are physically separated by a photopolymerizable layer or other barrier layer. Depending on the relative position of the photopolymerizable material with reference to the other active constituents, a positive image or a negative image is obtained. The active ingredients on one side of the barrier layer may be in the form of a coating, a solution in a suitable solvent, or even in a gaseous state.

Briefly in one embodiment of the process of the present invention a coating containing one of the reactive constituents and a coating containing another reactive constituent are deposited on opposite sides of a barrier layer which may be the photopolymerizable layer itself and then the assembly is exposed photographically. As a result of the exposure a latent image forms in the photopolymerizable layer. When the assembly is heated to a suitable temperature, the effect upon the viscosity of the exposed area is different from the effect of the heat upon the viscosity of the unexposed area and the difference in viscosity is utilized to control the diffusion of one or more of the active ingredients through the photopolymerizable layer. The reaction of the active constituents yields a positive colored image which corresponds to the latent image produced in the photopolymerizable layer as a result of the photographic exposure thereof.

The invention will be further understood from the drawings, in which

FIGURE 1 schematically shows in section one arrangement of film;

FIGURE 2 is a schematic flow sheet of the process.

As shown in FIGURE 1 the photosensitive assembly consists of a photopolymerizable layer 10 bearing a thin coating 12 on its upper surface and a thin coating 14 on its lower surface. One of the coatings contains $CBr_4$ or other organic free radical source of the type described below and the other of the coatings contains 4-p-dimethylaminostyrylquinoline or other dye base or leuco compound of the type described below. Photographic exposure of this assembly to a suitable dose of radiation, for example to radiation from a photoflood lamp 18 through a stencil, filter or negative 16. produces a polymeric latent image in the polymerizable layer and eventually a visible positive image upon gentle heating as described in the examples which follows.

FIGURE 2 is a schematic flow sheet outlining the steps in the process, which steps may be summarized as follows:

(1) Coat base or support with successive layers, allowing each layer to harden due to solvent evaporation before next layer is deposited;

(2) Expose to radiation, for example one minute to 500 watt photoflood; and (3) Heat at desired temperature for desired time to obtain image.

Example 1

A solution of 100 mg. of 3-6-bis(dimethylamino)-9-dimethylaminophenyl xanthene in 2 cc. of a 10% solution of polystyrene in benzene plus 2 cc. of acetone was prepared and then a layer of 1.5 mil wet thickness was coated on an inert support by means of a Bird Applicator or other means conventionally used to monitor thickness of coatings at 1.5 mil.

After the coating 14 dried, a photopolymerizable layer 10 was coated thereon, the layer being formulated from the following known composition:

Formula

| | Amounts (cc.) |
|---|---|
| Gelatin (15% aqueous) | 20.0 |
| Monomer solution consisting of: 0.7 g. methylene bisacrylamide, 18 g. acrylamide, 12 cc. $H_2O$ | 3.0 |
| Ferric ammonium citrate (3.6 g./100 cc.) | 5.0 |
| Cumene hydroperoxide | 0.5 |
| Nacconal NRSF (5%), detergent | 0.2 |

After layer 10 had dried, a third coating layer 12 was deposited from a solution of $CBr_4$ and polystyrene which was formulated by adding 700 mg. of $CBr_4$ to 2 cc. of a 10% solution of polystyrene in benzene plus 2 cc. of acetone. Layer 12 was also 1.5 mil thick.

The entire multilayer film was exposed as shown in FIGURE 1 for one minute to a RFL2 500 watt photoflood lamp at 12″ distance through a 21 step 3.0 neutral density Step Tablet. The light intensity was measured as $5.7 \times 10^4$ meter candles at the plane of layer 12. The film was then heated for four minutes at about 80°C in the warm air stream of a forced convection oven.

Example 2

Example 1 was repeated using a polymerizable layer of the following formulation:

Formula

| | Amounts | |
|---|---|---|
| Gelatin (15%) | cc | 50.0 |
| Methylene bisacrylamide | g | 2.0 |
| Acrylamide | g | 6.0 |
| Ferric ammonium oxalate trihydrate | g | 2.56 |
| Cumene hydroperoxide | cc | 1.0 |
| Nacconal NRSF (5%), detergent | cc | 1.0 |

Exposures were made as in Example 1.

TABLE I

| Example Number | Temperature of Heating (°C.) | Image type | Density Unexposed | Density Fully exposed |
|---|---|---|---|---|
| 1 | 80 | Positive | 1.2 | 0.8 |
| 2 | 125 | do | 3.0+ | 0.44 |

The photosensitive compositions for the photopolymerizable layer described above were formulated using compositions described by F. W. H. Mueller, H. Evans and E. Cerwonka in Photographic Science and Engineering 6, 227 (1962), but it will be apparent to those skilled in the art that other compositions of similar properties may be substituted for this layer without departing from the intended scope of this invention.

Similarly, although $CBr_4$ and 3-6-bis(dimethylamino)-9-(dimethylamino)phenyl xanthene have been used as the reactant pair other compounds could be used in their stead.

Instead of $CBr_4$ any organic halogen compound which can diffuse at a sufficient rate through the barrier layer may be used, such as organic halogen compounds containing substituents such as H, Cl, Br, I, alkyl, substituted alkyl (particularly haloalkyl), aryl or aroyl.

Instead of the specified leuco xanthene compound other leuco compounds may be used, such as styryl dye bases described in United States Patent 3,095,303 and the leuco triphenylmethane dyes described in United States Patent 3,113,024. Specifically such leuco compounds as leuco Crystal Violet, leuco Malachite Green and others described in the patents noted could be used.

The following list of patents and patent applications contain references to photosensitive pairs which could be used instead of those given by way of specific example:

U.S. Patents: 3,095,303; 3,100,703; 3,102,810; 3,109,736; 3,113,024; 3,121,632; 3,121,633; 3,140,949; 3,285,744; 3,272,635; 3,284,205; 3,342,595; 3,342,602; 3,342,603; 3,342,604.

As illustrated in these patents, suitable reactant pairs may comprise (A) one or more organic halogen compounds as described in the patents noted below, usually defined by the formula $A—C—X_3$ wherein A represents H, Cl, Br, I, alkyl, haloalkyl, aryl, aralkyl or aroyl and each X is an atom of Cl, Br or I; and/or organic acids or anhydrides or ketones; and/or mercaptans or organic disulfides paired with (B) one or more leuco di- or triphenlymethanes, leuco dihydroanthracenes, leuco xanthenes, leuco acridenes, leuco fluorenes, carbinols of the above leucos, styryl bases and higher vinyl homologues, cyanine bases and related compounds, merocyanine dye bases and/or various poly functional compounds including at least some structure as those enumerated in (B).

The proportions of the active constituents are in general similar to those disclosed in the patents above, i.e. between about 7 and 500 parts of $CBr_4$ or equivalent compound for each 1 part by weight of the other member of the photosensitive pair, e.g. leuco compound or dye base.

Instead of having each layer laid down as 1.5 mils (wet thickness), the layers may be thicker or thinner provided only that the photopolymerizable layer is sufficiently thin to permit diffusion of the active materials into contact with one another upon heating.

What is claimed is:
1. A photographic film comprising at least three layers:
   (1) a first layer consisting of a photopolymerizable composition;
   (2) a second layer containing a first compound which is capable of reacting thermally with a second compound to produce a visible reaction product; and
   (3) a third layer containing said second compound;
   said second and third layers being separated from one another by said first layer which is substantially free from said first compound and said second compound, and wherein said third layer contains as said second compound at least one volatile compound selected from the group consisting of organic halogen compounds defined by the formula $A—C—X_3$ wherein A is a monovalent radical selected from the group consisting of H, Cl, Br, I, alkyl, haloalkyl, aryl, aralkyl and aroyl and each X is an atom of halogen selected from the group consisting of Cl, Br and I, and said second layer contains as said first compound at least one compound selected from the group consisting of leuco di- or triphenylmethanes, leuco dihydroanthracenes, leuco xanthenes, leuco acridenes, leuco fluorenes, carbinols of the above leucos, styryl bases and higher homologues, cyanine bases and related compounds, merocyanine dye bases and poly-functional compounds including at least some structure as those enumerated.

2. The method which comprises preparing the film of claim 1, photographically exposing said film to produce a latent polymer image in said photopolymerizable layer and thereafter heating to produce a visible image from said latent image bearing film.

3. The method of claim 2 in which the image bearing film is rinsed in a solvent to remove any unreacted amounts of at least one of said first and second compounds from said film.

4. The film of claim 1 wherein the layers are deposited as consecutive coatings on one film base.

5. The film of claim 4 wherein the layers are coated on the film base in the sequence: the layer with the second compound, the photopolymerizable layer, the layer with the first compound.

6. The film of claim 1 wherein the volatile organic halogen compound is $CBr_4$.

7. A multi-layer photographic film in which the optical density of the image is controlled by the rate of diffusion of an active ingredient from one layer of the film through another layer of the same film consisting of a polymerized or crosslinked substance which has been polymerized or crosslinked by the action of light in the image area, and in which the image density is produced by a thermal reaction of such active ingredient with a second such ingredient in a third layer of the film, and in which the rate of diffusion of an active ingredient is accelerated by heating after the photographic exposure, said active ingredient and said second such ingredient being capable of reacting thermally with each other to produce a visible reaction product and said active ingredient being an organic halogen compound defined by the formula A—C—$X_3$ wherein A is a monovalent radical selected from the group consisting of H, Cl, Br, I, alkyl, haloalkyl, aryl, aralkyl and aroyl and each X is an atom of halogen selected from the group consisting of Cl, Br and I, and said second such ingredient being a compound selected from the group consisting of leuco di- or tri-phenyl-methanes, leuco dihydroanthracenes, leuco xanthenes, leuco acridenes, leuco fluorenes, carbinols of the above leucos, styryl bases and higher vinyl homologues, cyanine bases and related compounds, merocyanine dye bases and poly-functional compounds including at least some structure as those enumerated.

8. The film of claim 7 wherein the diffusable active ingredient is $CBr_4$.

References Cited

UNITED STATES PATENTS

| | | | |
|---|---|---|---|
| 3,042,519 | 7/1962 | Wainer | 96—48 |
| 3,218,167 | 11/1965 | Burg et al. | 96—85 |
| 3,245,796 | 4/1966 | Burg | 96—67 |
| 3,255,002 | 6/1966 | Rogers | 96—29 |
| 3,275,437 | 9/1966 | Cohen | 96—29 |
| 3,306,744 | 2/1967 | Haas | 96—29 |

NORMAN G. TORCHIN, Primary Examiner

RONALD H. SMITH, Assistant Examiner

U.S. Cl. X.R.

96—48, 67, 88, 90, 115

UNITED STATES PATENT OFFICE
CERTIFICATE OF CORRECTION

Patent No. 3,484,238            Dated Dec. 16, 1969

Inventor(s) Robert D. Fox

It is certified that error appears in the above-identified patent and that said Letters Patent are hereby corrected as shown below:

In the drawings, Cancel Figure 2 and renumber Figure 3 to be Figure 2.

In the abstract, in the next to last line; correct --styryl--.

Column 3, line 9; change "3.6g/100 cc." to read--3.6g/10cc.

In Claim 5, line 2; change "second" to --first--.

In Claim 5, last line; change "first" to --second.

SIGNED AND
SEALED

JUL 21 1970

(SEAL)
Attest:

Edward M. Fletcher, Jr.
Attesting Officer

WILLIAM E. SCHUYLER, JR.
Commissioner of Patents